United States Patent
Exterman

(10) Patent No.: US 9,509,827 B2
(45) Date of Patent: Nov. 29, 2016

(54) APPARATUS, SYSTEM AND METHOD OF MANAGING AT A MOBILE DEVICE EXECUTION OF AN APPLICATION BY A COMPUTING DEVICE

(71) Applicant: INTEL IP CORPORATION, Santa Clara, CA (US)

(72) Inventor: Tomer Exterman, Tel Aviv (IL)

( * ) Notice: Subject to any disclaimer, the term of this patent is extended or adjusted under 35 U.S.C. 154(b) by 0 days.

(21) Appl. No.: 14/206,052

(22) Filed: Mar. 12, 2014

(65) Prior Publication Data
US 2015/0264557 A1    Sep. 17, 2015

(51) Int. Cl.
H04M 3/00      (2006.01)
H04M 1/725    (2006.01)
G06F 9/48      (2006.01)

(52) U.S. Cl.
CPC .......... *H04M 1/7253* (2013.01); *G06F 9/4856* (2013.01)

(58) Field of Classification Search
CPC .......................... H04M 1/7253; G06F 9/4856
USPC .............................. 455/420; 718/1; 345/173
See application file for complete search history.

(56) References Cited

U.S. PATENT DOCUMENTS

| | | | |
|---|---|---|---|
| 2009/0150410 A1* | 6/2009 | Kaplan | G06F 17/30905 |
| 2010/0009690 A1 | 1/2010 | Jin et al. | |
| 2010/0169659 A1* | 7/2010 | Shnowske et al. | 713/183 |
| 2011/0242032 A1* | 10/2011 | Seo | G06F 3/04886 345/173 |
| 2012/0084784 A1 | 4/2012 | Mir et al. | |
| 2013/0080618 A1* | 3/2013 | Balwani | G06F 13/00 709/224 |
| 2013/0097596 A1* | 4/2013 | Queru | G06F 9/44526 717/176 |
| 2013/0212486 A1* | 8/2013 | Joshi et al. | 715/744 |
| 2013/0263126 A1* | 10/2013 | Kulkarni et al. | 718/1 |

FOREIGN PATENT DOCUMENTS

KR       20120129257      11/2012

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wi-Fi Alliance Technical Committee P2P Task Group, Wi-Fi Peer-to-Peer (P2P) Technical Specification, Version 1.2, Dec. 14, 2011, 160 pages.

(Continued)

*Primary Examiner* — Wayne Cai
(74) *Attorney, Agent, or Firm* — Shichrur & Co.

(57) ABSTRACT

Some demonstrative embodiments include apparatuses, systems and/or methods of managing at a mobile device execution of an application on a computing device. For example, an apparatus may include an execution manager to manage at a mobile device execution of an application by a computing device, the execution manager to communicate with the computing device over a wireless communication link between the mobile device and the computing device, and to execute at the mobile device a front-end to control interaction between a user of the mobile device and the application according to a configuration of the mobile device.

20 Claims, 3 Drawing Sheets

(56) References Cited

OTHER PUBLICATIONS

Wireless Gigabit Alliance (WGA) Specifications, WiGig MAC and PHY Specification Version 1.1, Apr. 2011—Final Specification, 442 pages.

International Search Report and Written Opinion for International Patent Application No. PCT/US2015/015332, mailed on May 21, 2015, 12 pages.

International Preliminary Report on Patentability for PCT/US2015/015332, mailed on Sep. 22, 2016, 9 pages.

* cited by examiner

APPARATUS, SYSTEM AND METHOD OF MANAGING AT A MOBILE DEVICE EXECUTION OF AN APPLICATION BY A COMPUTING DEVICE

TECHNICAL FIELD

Embodiments described herein generally relate to managing at a mobile device execution of an application on a computing device.

BACKGROUND

Mobile platforms are becoming smaller and smaller, and typically have decreasingly smaller screens and less Input/Output (JO) ports from generation to generation.

Mobile platforms may include computing resources ("low-end resources"), e.g., a memory, a processor, a graphic processing unit (GPU) and the like, which may provide reduced performance, compared to the performance provided by computing resources ("high-end resources") of computing platforms. For example, a tablet and/or a Smartphone may have low-end resources, e.g., a low performance memory and/or processor, while a personal computer and/or a laptop computer may have high-end resources, e.g., a high-end processor and/or a large size memory.

The computing resources of the mobile device may not enable executing some applications on the mobile device. For example, a graphics editing application or a numerical computing application may not be executed on a Smartphone or a Tablet computer having low-end resources.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
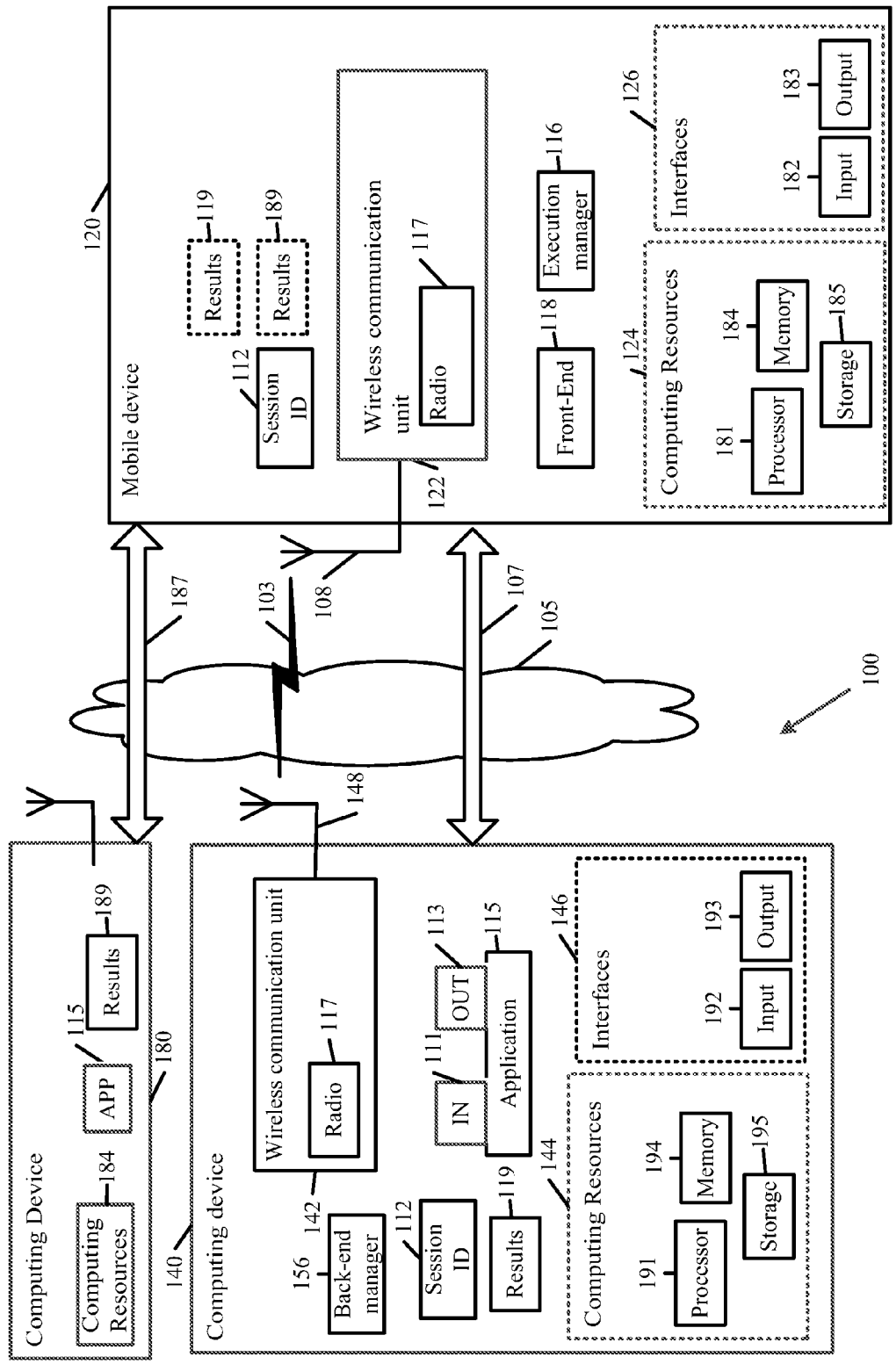
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "downloading" as used herein with respect to an element includes sending the element and/or receiving the element. For example, a device, which is capable of downloading an application, may send the application to at least one other device, and/or may receive the application from at least one other device. The verb downloading may be used to refer to the action of sending or the action of receiving. In one example, the phrase "downloading an application" may refer to the action of sending the application by a first device, and may not necessarily include the action of receiving the application by a second device. In another example, the phrase "downloading an application" may refer to the action of receiving the application by a first device, and may not necessarily include the action of sending the application by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments system 100 may include one or more wireless communication devices capable of communicating content, data, information and/or signals via a wireless medium (WM) 105. For example, system 100 may include one or more mobile devices, e.g., a mobile device 120, and/or one or more computing devices, e.g., a computing device 140.

In some demonstrative embodiments, mobile device 120 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a Smartphone, or the like.

In some demonstrative embodiments, computing device 140 may include a mobile or a non-mobile device, e.g., a static device.

In some demonstrative embodiments, computing device 140 may include, for example, a PC, a desktop computer, a mobile computer, a laptop computer, a notebook computer, a tablet computer, a server computer, a mobile or portable device, a non-mobile or non-portable device, or the like.

In some demonstrative embodiments, wireless medium 105 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, device 120 and/or device 140 may include wireless communication units, to perform wireless communication between device 120 and device 140 and/or with one or more other wireless communication devices over WM 105. For example, device 120 may include a wireless communication unit 122, and/or device 140 may include a wireless communication unit 142.

In some demonstrative embodiments, the wireless communication units may include one or more radios. For example, wireless communication unit 122 and/or wireless communication unit 142 may include a radio 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 122 and/or 142 may include or may be implemented as part of a wireless Network Interface Card (NIC), and the like.

In some demonstrative embodiments, the wireless communication units may include, or may be associated with, one or more antennas. For example, wireless communicate unit 122 may be associated with one or more antennas 108 and wireless communicate unit 142 may be associated with one or more antennas 148.

Antennas 108 and/or 148 may include any type of antennas suitable for transmitting and/or receiving wireless communication signals, blocks, frames, transmission streams, packets, messages and/or data. For example, antennas 108 and/or 148 may include any suitable configuration, structure and/or arrangement of one or more antenna elements, components, units, assemblies and/or arrays. Antennas 108 and/or 148 may include, for example, antennas suitable for directional communication, e.g., using beamforming techniques. For example, antennas 108 and/or 148 may include a phased array antenna, a multiple element antenna, a set of switched beam antennas, and/or the like. In some embodiments, antennas 108 and/or 148 may implement transmit and receive functionalities using separate transmit and receive antenna elements. In some embodiments, antennas 108 and/or 148 may implement transmit and receive functionalities using common and/or integrated transmit/receive elements.

In some demonstrative embodiments, mobile device 120 may also include, for example, a processor 181, an input interface 182, an output interface 183, a memory unit 184, and a storage unit 185; and/or computing device 140 may also include, for example, a processor 191, an input interface 192, an output interface 193, a memory unit 194, and a storage unit 195. Mobile device 120 and/or computing device 140 may optionally include other suitable hardware components and/or software components. In some demonstrative embodiments, some or all of the components of mobile device 120 and/or computing device 140 may be enclosed in a common housing or packaging, and may be interconnected or operably associated using one or more wired or wireless links. In other embodiments, components of mobile device 120 and/or computing device 140 may be distributed among multiple or separate devices.

Processor 181 and/or processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 181 executes instructions, for example, of an Operating System (OS) of mobile device 120 and/or of one or more suitable applications; and/or processor 191 executes instructions, for example, of an Operating System (OS) of computing device 140 and/or of one or more suitable applications.

Memory unit 184 and/or memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 185 and/or storage unit 195 may include, for example, a hard disk drive, a floppy disk drive, a Compact Disk (CD) drive, a CD-ROM drive, a DVD drive, or other suitable removable or non-removable storage units. For example, memory unit 184 and/or storage unit 185, for example, may store data processed by computing device 140, and/or memory unit 194 and/or storage unit 195, for example, may store data processed by mobile device 120.

Input interface 182 and/or input interface 192 may include, for example, a keyboard, a keypad, a mouse, a touch-screen, a touch-pad, a track-ball, a stylus, a microphone, or other suitable pointing device or input device. Output interface 183 and/or output interface 193 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, a configuration of devices 120 and/or 140 may include a configuration of computing resources of devices 120 and/or 140 and/or a configuration of interfaces of devices 120 and/or 140.

In some demonstrative embodiments, device 120 may include computing resources 124 to process, to transfer, to handle, and/or to execute, applications, data and/or instructions at device 120.

In some demonstrative embodiments, computing resources 124 may include, for example, processor 181, memory unit 184, storage unit 185 and/or any other computing resource of mobile device 120, e.g., a graphical processing resource of device 120, a data transfer resource of device 120, a power resource of the device 120 and/or the like.

In some demonstrative embodiments, device 140 may include computing resources 144 to process, to transfer, to handle, and/or to execute, applications, data and/or instructions at device 140.

In some demonstrative embodiments, computing resources 144 may include, for example, processor 191, memory unit 194, storage unit 195 and/or any other computing resource of mobile device 120, e.g., a graphical processing resource of device 140, a data transfer resource of device 140, a power resource of the device 140 and/or the like.

In some demonstrative embodiments, the interfaces of devices 120 and/or 140 may include any hardware and/or software elements and/or components configured to interact with a user of devices 120 and/or 140.

In some demonstrative embodiments, mobile device 120 may include interfaces 126 to interact with a user of device 120.

In some demonstrative embodiments, interfaces 126 of mobile device 120 may include, for example, input interface 182, output interface 183 and/or any other interface.

In some demonstrative embodiments, computing device 140 may include interfaces 146 to interact with a user of device 140.

In some demonstrative embodiments, interfaces 146 of mobile device 140 may include, for example, input interface 192, output interface 193, and/or any other interface.

In some demonstrative embodiments, computing resources 124 of mobile device 120 may be different from computing resources 144 of computing device 140. For example, computing resources 124 may include resources ("low-end resources"), which provide reduced performance, while computing resources 144 may include resources ("high-end resources"), which provide increased performance, e.g., compared to the low-end resources.

In one example, device 120 may include a tablet and device 140 may include a notebook. According to this example, processor 181 may have reduced performance compared to the performance of processor 191, e.g., a CPU speed of processor 191 may be greater than a CPU speed of processor 181, and/or a number of cores of processor 191 may be greater than a number of cores of processor 181; memory 184 may have reduced performance compared to the performance of memory 194, e.g., a memory speed of memory 194 may be greater than a memory speed of memory 184, and/or a memory size of memory 194 may be greater than a memory size of memory 184; and/or storage 185 may have reduced performance compared to the performance of storage 195, e.g., a storage speed of storage 195 may be greater than a storage speed of storage 185 and/or a storage size of storage 195 may be greater than a storage size of storage 185.

In some demonstrative embodiments, interfaces 126 of mobile device 120 may be different from interfaces 146 of computing device 140.

In some demonstrative embodiments, interfaces 126 may have a reduced size compared to the size of interfaces 146.

In one example, output interface 183 may have a reduced size compared to the size of output interface 193. For example, device 120 may include a Smartphone and device 140 may include a PC. According to this example, output interface 193 may include, for example, a relatively large screen, e.g., having a screen size of between 15 and 24 inches; and/or output interface 183 may include a relatively small touch screen, e.g., having a screen size of between 3 and 5 inches.

In another example, input interface 182 may have a reduced size compared to the size of input interface 192. For example, device 120 may include the Smartphone and device 140 may include the PC. According to this example, input interface 192 may include, for example, a full-size keyboard, and/or input interface 182 may include a virtual keyboard displayed on a relatively small touch screen.

In some demonstrative embodiments, a type of interfaces 126 may be different from the type of interfaces 146.

In one example, a type of input interface 182 may be different from the type of input interface 192. For example, device 120 may include a Smartphone and device 140 may include a PC. According to this example, input interface 192 may include, for example, a mouse and/or a keyboard, and/or input interface 182 may include a touch screen;

In some demonstrative embodiments, a user of mobile device 120 may utilize an application 115.

In some demonstrative embodiments, execution of application 115 may require the high-end resources. For example, application 115 may include, for example, a graphics editing application, a video editing application, a software development application, a numerical computing application or the like, which requires high-end resources.

In some demonstrative embodiments, application 115 may utilize computing resources, which exceed computing resources 124. For example, application 115 may utilize a processor having a CPU speed, which exceeds a maximal speed of processor 181; a memory having a size, which exceeds a maximal size of memory 184; a storage having a capacity, which exceeds a maximal capacity of storage 185; and/or any other computing resource, which exceeds a corresponding computing resource of computing resources 124.

In some demonstrative embodiments, mobile device 120 may not be able to execute application 115, for example, if application 115 utilizes computing resources, which exceed computing resources 124. For example, mobile device 120 may not be able to execute application 115, for example, if application 115 utilizes a CPU speed, which exceeds the CPU speed of processor 181.

In some demonstrative embodiments, mobile device 120 may be able to execute application 115. However, application 115 may run slowly, may be "stuck" periodically, and/or may not be executed correctly, for example, if application 115 utilizes computing resources, which exceed computing resources 124. For example, application 115 may run slowly on mobile device 120, for example, if application 115 requires a memory size, which exceeds the size of memory 184.

In some demonstrative embodiments, application 115 may be configured to interact with a user of application 115 via one or more application interfaces, which enable effective, interactive, and/or enhanced user experience, e.g., when the user interacts with application 115. For example, application 115 may be configured to interact with the user of a video editing application via a relatively large screen, e.g., to display menus and/or content of the video editing application and/or via a full size keyboard and a mouse, e.g., to enable the user to utilize functionalities of the video editing application.

In some demonstrative embodiments, the user of mobile device 120 may not be able to fully utilize the functionalities of application 115 and/or to have an effective user experience with application 115, for example, if interfaces 126 are not suitable to interact with application 115.

In one example, a user of mobile device 120 may not be able to provide inputs to application 115, for example, if input interface 192 is not suitable to interact with application 115, e.g., if application 115 requires a mouse to interact with application 115 and input interface 182 includes a touch screen.

In another example, the user of mobile device 120 may not be able to receive outputs from application 115, for example, if output interface 193 is not suitable to interact with application 115, e.g., if application 115 uses a large screen to display content to the user and output interface 183 includes a reduced-size screen.

Some demonstrative embodiments may enable mobile device 120 to execute application 115, for example, by utilizing computing resources 144 of computing device 140.

Some demonstrative embodiments may enable the user of mobile device 120 to interact with application 115 via input interface 182 and/or output interface 183.

In some demonstrative embodiments, mobile device 120 may include an execution manager 116 to manage at mobile device 120 execution of application 115 by computing device 140.

In some demonstrative embodiments, execution manager 116 may be implemented as part of an operating system of device 120. In other embodiments, execution manager 116 may be part of any other software module and/or hardware component of device 120.

In some demonstrative embodiments, computing device 140 may include a back-end manager 156 to manage the execution of application 115 by computing device 140.

In some demonstrative embodiments, execution manager 116 may communicate with computing device 140 over a wireless communication link 103 between mobile device 120 and computing device 140.

In some demonstrative embodiments, back-end manager 156 may communicate with mobile device 120 over wireless communication link 103.

In some demonstrative embodiments, wireless communication link 103 may include a WiFi Direct wireless communication link.

In some demonstrative embodiments, wireless communication link 103 may include a peer-to-peer (P2P) communication link.

In other embodiments, wireless communication link 103 may include any other wireless communication link.

In some demonstrative embodiments, execution manager 116 may send application 115 from mobile device 120 to computing device 140, e.g., over wireless communication link 103.

In some demonstrative embodiments, back-end manager 156 may receive application 115 from mobile device 120, e.g., over wireless communication link 103.

In other embodiments, back-end manager 156 may receive application 115 from another device, e.g., other than mobile device 120. For example, back-end manager 156 may download application 115 from the Internet, or from any other source.

In some demonstrative embodiments, execution manager 116 may execute at mobile device 120 a front-end 118 to control interaction between a user of mobile device 120 and application 115.

In some demonstrative embodiments, back-end manager 156 may execute application 115.

In some demonstrative embodiments, front-end 118 may control the interaction between the user of mobile device 120 and application 115 according to the configuration of mobile device 120.

In some demonstrative embodiments, front-end 118 may control the interaction between the user of mobile device 120 and application 115 according to a configuration of at least one computing resource of computing resources 124.

For example, front end 118 may control the interaction between the user of mobile device 120 and application 115 according to a configuration of processor 181, memory unit 184, storage unit 185 and/or any other computing resources of mobile device 120.

In some demonstrative embodiments, front-end 118 may control the interaction between the user of mobile device 120 and application 115 according to a configuration of at least one interface of interfaces 126.

For example, front-end 118 may control the interaction between the user of mobile device 120 and application 115 according to a configuration of input interface 182 and/or a configuration of output interface 183.

In some demonstrative embodiments, front-end 118 may provide to application 115 one or more application inputs via an application input interface 111 of application 115, based on user inputs received from the user via input interface 182.

In some demonstrative embodiments, input interface 182 may be different from application input interface 111. For example, input interface 182 may include a reduced-size touch screen and application input interface 111 may be configured to interact with a mouse and a keyboard.

In some demonstrative embodiments, front-end 118 may convert the user inputs received from the user via input interface 182 into application inputs to be provided to application 115 via application input interface 111. For example, front-end 118 may convert finger gestures, e.g., a tap, a press, a pinch, and/or the like, of the user of mobile device 120 on the touch screen into mouse and/or keyboard inputs to be provided to application 115 via application input interface 111.

In some demonstrative embodiments, application 115 may provide execution results 119 produced by application 115 via application output interface 113.

In some demonstrative embodiments, execution results 119 may include any product, data, information, manipulation, video, audio, and/or any other element produced, generated, and/or processed by application 115 via application output interface 113. For example, execution results of a video editing application may include an edited video, a video file, content to be displayed on a screen, temporary video content, and/or any other byproduct, and/or output results of an execution of the video editing application.

In some demonstrative embodiments, back-end manager 156 may send to mobile device 120 execution results 119 produced by application 115.

In some demonstrative embodiments, back-end manager 156 may periodically send execution results 119 to mobile device 120, for example, to update front-end 118 with execution results 119.

In some demonstrative embodiments, front-end 118 may receive execution results 119 from computing device 140 and may provide execution results 119 to the user of mobile device 120 via output interface 183 of mobile device 120.

In some demonstrative embodiments, the configuration of output interface 183 may be different from a configuration of application output interface 113. For example, output interface 183 may include a reduced-size display, e.g., of a Smartphone, and application output interface 113 may be configured to provide outputs to be displayed on an increased-size display, e.g., a screen attached to a PC.

In some demonstrative embodiments, front-end 118 may convert application outputs from application output interface 113 into outputs to be provided to the user via output interface 183. For example, front end 118 may convert application outputs to be displayed on an increased-size screen, e.g., a menu list, into outputs to be displayed on a reduced-size screen, e.g., large icons.

In some demonstrative embodiments, front-end 118 may display a user interface of application 115 on mobile device 120.

In some demonstrative embodiments, the user interface may enable the user to provide the user inputs via input interface 182.

In some demonstrative embodiments, the user interface may enable to display the execution results to the user of mobile device 102 via output interface 183.

In some demonstrative embodiments, the user interface may include a customized and/or a tailored user interface according to the configuration of mobile device 120. For example, the user interface may be customized according to the configuration of interfaces 126.

In one example, the user interface may be customized to a reduced-size touch screen, e.g., by displaying content of application 115 via relatively large size icons and the like, for example, if input interface 182 includes a reduced-size touch screen.

In some demonstrative embodiments, back-end manager 156 may not display a user interface of application 115 on computing device 140.

In some demonstrative embodiments, back-end manager 156 may display an indication indicating computing device 140 is executing application 115.

In some demonstrative embodiments, execution manager 116 may open a session 107 between mobile device 120 and computing device 120 to manage the execution of application 115 during session 107.

In some demonstrative embodiments, execution manager 116 may assign a unique session identifier 112 to session 107. In other embodiments, unique session identifier 112 may be assigned by back-end manager 156, or any other element of system 100.

In some demonstrative embodiments, execution manager 116 may store session identifier 112, e.g., in storage 185. In other embodiments, execution manager 116 may store session identifier 112 in any other storage and/or memory component of mobile device 120.

In some demonstrative embodiments, back-end manager 156 may open session 107 to control the execution of application 115, e.g., during session 107.

In some demonstrative embodiments, back-end manager 156 may store session identifier 112, e.g., in storage 195. In other embodiments, back-end manager 156 may store session identifier 112 in any other storage and/or memory component of computing device 140.

In some demonstrative embodiments, back-end manager 156 may execute application 115 during session 107, and front-end 118 may control the execution of application 115 by back-end manager 156, e.g., as described above.

In some demonstrative embodiments, execution manager 116 may enable continuous execution of application 115 by computing device 140, e.g., as described below.

In some demonstrative embodiments, session 107 may enable continuous execution of application 115 by computing device 140, for example, even if mobile device 120 disconnects from computing device 140 and/or closes wireless communication link 103.

In some demonstrative embodiments, back-end manager 156 may store execution results 119 of application 115 associated with session identifier 112 of session 107.

In some demonstrative embodiments, mobile device 120 may disconnect from computing device 140 and may close wireless communication link 103 and/or session 107, for example, if the user of mobile device 120 completes using application 115.

In some demonstrative embodiments, execution manager 116 may reestablish wireless communication link 103 between mobile device 120 and computing device 140, for example, to continue to execute application 115 by computing device 140.

In some demonstrative embodiments, execution manager 116 may send session identifier 112 to computing device 140, for example, to indicate to computing device 140 to continue to execute application 115 using execution results 119, which are associated with session identifier 112.

In some demonstrative embodiments, back-end manager 156 may receive session identifier 112 from mobile device 120.

In some demonstrative embodiments, back-end manager 156 may retrieve execution results 119 based on session identifier 112.

In some demonstrative embodiments, back-end manager 156 may continue to execute application 115 using execution results 119.

In one example, application 115 may include a video editing application and executing results 119 may include a first edited video file of a raw video file. According to this example, after disconnecting of wireless communication link 103 and/or closing session 107, execution manager 116 may be able to continue to execute application 115 using the first edited video file and to produce a second edited video file based on the first edited video, for example, when execution manager 116 reestablishes wireless communication link 103 and/or session 107.

In some demonstrative embodiments, storing of execution results 119 by computing device 140 may enable seamless continuous execution of application 115 by computing device 140.

In some demonstrative embodiments, execution manager 116 may enable continuous execution of application 115 by any other computing device, for example, after execution of application 115 by computing device 140, e.g., as described below.

In one example, computing device 140 may be located at a first location and an other computing device 180 may be located at a second location, e.g., different from the first location. According to this example, execution manager 116 may enable continuous execution of application 115 by the user of mobile device 120, for example, when the user is located in proximity to the first location, e.g., by execution of application 115 by computing device 140; and/or when the user moves to a location in proximity to the second location, e.g., by execution of application 115 by computing device 180.

In some demonstrative embodiments, back-end manager 156 may send execution results 119 to mobile device 120, when session 107 is closed.

In some demonstrative embodiments, execution manager 116 may store execution results 119, e.g., in storage 185.

In some demonstrative embodiments, mobile device 120 may disconnect from computing device 140 and may close wireless communication link 103 and/or session 107, for example, if the user of mobile device 120 stops using application 115.

In some demonstrative embodiments, execution manager 116 may store execution results 119, for example, to enable the continuous execution of application 115 by computing device 180.

In some demonstrative embodiments, execution manager 116 may utilize execution results 119 stored in mobile device 120, for example, to enable continuous execution of application 115 by computing device 180.

In some demonstrative embodiments, execution manager 116 may open another session 187 with computing device 180 to manage execution of application 115 on computing device 180 using execution results 119.

In some demonstrative embodiments, computing device 180 may execute application 115 using execution results 119 and may produce execution results 189 of application 115, e.g., when executed by computing device 180.

In some demonstrative embodiments, execution manager 116 may enable continuous execution of application 115 by an other computing device, for example, after execution of application 115 by computing device 140 and by computing device 180.

In some demonstrative embodiments, execution manager 116 may enable continuous execution of application 115 by any other computing device, for example, by sending execution results 119 to the other computing device, e.g., as describe above.

In some demonstrative embodiments, execution manager 116 may enable continuous execution of application 115 by a previously used computing device, which was previously used to execute application 115.

For example, execution manager 116 may enable continuous execution of application 115 by computing device 140, e.g., after execution of application 115 by computing device 140 and by computing device 180.

In some demonstrative embodiments, execution manager 116 may enable continuous execution of application 115 by sending updated execution results to the previously used computing device, e.g., as described below.

In some demonstrative embodiments, computing device 180 may send execution results 189 to mobile device 120.

In some demonstrative embodiments, execution manager 116 may store and replace execution results 119 with execution results 189.

In some demonstrative embodiments, execution manager 116 may utilize execution results 189 to execute application 115 by computing device 140.

In some demonstrative embodiments, execution manager 116 may open session 107, for example, to continue to execute application 115 by computing device 120, e.g., after executing application 115 by computing device 180.

In other embodiments, execution manager 116 may open a new session, e.g., to continue to execute application 115 by computing device 120.

In some demonstrative embodiments, execution manger 116 may send execution results 189 to computing device 140, for example, to enable back-end manager 156 to execute application 115 using execution results 189.

In one example, application 115 may include the video editing application and execution results 189 may include the second edited video file. According to this example, after disconnecting from computing device 180, execution manager 116 may be able to continue to execute application 115 on computing device 140 using execution results 189, for example, to produce a third edited video file based on execution results 189.

In some demonstrative embodiments, execution manager 116 may be able to select a potential computing device from a plurality of computing devices to execute application 115.

In some demonstrative embodiments, execution manager 116 may select the potential computing device based on computing resources of the potential computing device.

In one example, application 115 may be a graphics-editing program, which utilizes high-end computing resources. According to this example, execution manager 116 may select a first computing device having first computing resources, for example, if the first computing resources include high-end resources compared to second computing resources of a second computing device.

In some demonstrative embodiments, execution manager 116 may receive an indication of a plurality of potential computing devices to execute application 115. For example, execution manager 116 may receive an indication including computing device 140 and computing device 180.

In some demonstrative embodiments, computing device 140 may send to mobile device 120 resource information relating to computing resources 124 of computing device 140.

In some demonstrative embodiments, computing device 180 may send to mobile device 120 resource information relating to computing resources 174 of computing device 180.

In some demonstrative embodiments, execution manager 116 may receive resource information relating to computing resources of the potential computing devices. For example, the resource information may include the resource information relating to computing resources 124 and the resource information relating to computing resources 174.

In some demonstrative embodiments, execution manager 116 may select a computing device of the potential computing devices based on the resource information. For example, execution manager 116 may select a commuting device having computing resources, which are most suitable to execute application 115.

In one example, computing resources 124 may include an increased-size memory 184 and a reduced CPU speed processor 181; and computing resources 174 may include a reduced-size memory and an increased CPU speed processor. According to this example, execution manager 116 may select computing device 140, for example, if application 115 utilizes a large size memory; and/or execution manager 116 may select computing device 180, for example, if application 115 utilizes a relatively increased CPU speed processor.

In another example, execution manager 116 may select a computing device of the potential computing devices based on a current CPU utilization and/or a current memory utilization of the computing device. For example, execution manager 116 may select computing device 140, for example, if a current amount of free memory resources of memory 194 and/or a current amount of free CPU resources of processor 191 is greater than a current amount of free memory and/or a processor resources of computing device 180.

In another example, execution manager 116 may select a computing device of the potential computing devices based on a battery status of the computing device. For example, execution manager 116 may select computing device 140, for example, if computing device 140 is connected to a power supply, while computing device 180, is not connected to a power supply and/or has a relatively short battery life.

In some demonstrative embodiments, execution manager 116 may be able to select the computing device, for example, even if the computing device is being used by another user. For example, execution manager 116 may select computing device 140, for example, even if computing device 140 is being used by another user, e.g., to surf the Internet.

In some demonstrative embodiments, execution manager 116 may execute application 115 on the computing device concurrently with any applications being executed by the other user. For example, execution manager 116 may execute application 115 in a background, while not interfering with the applications being executed by the other user.

In some demonstrative embodiments, execution manager 116 may select the computing device of the potential computing devices based on an input from the user of mobile device 120.

In one example, execution manager 116 may display the plurality of potential computing devices to the user of mobile device 120, e.g., on the user interface, and the user of mobile device 120 may select the computing device from the plurality of the potential computing devices, e.g., via input interface 182.

In some demonstrative embodiments, execution manager 116 may send an indication to computing device 140 to delete execution results 119.

In some demonstrative embodiments, the indication may include session identifier 112.

In some demonstrative embodiments, execution manager 156 may delete execution results 119, session identifier 112 and/or session information associated with session identifier 112, which are stored in computing device 140.

In one example, execution manager 156 may delete execution results 119 from computing device 140, for example, if the user of mobile device 120 no longer uses computing device 140 to execute application 115.

In some demonstrative embodiments, computing device 140 may receive the indication and back-end manager 156 and may delete execution results 119 and/or session identifier 112 from computing device 140 based on the indication.

In some demonstrative embodiments, execution of application 115 on computing device 140 may enable mobile device 120 to execute applications, which utilize computing resources that exceed computing resources 124.

In some demonstrative embodiments, execution of front-end 118 on mobile device 120 and execution of application 115 on computing device 140 may enable a user of mobile device 120 to fully utilize functionalities of application 115 using interfaces 126 of mobile device 120.

Figure 2:
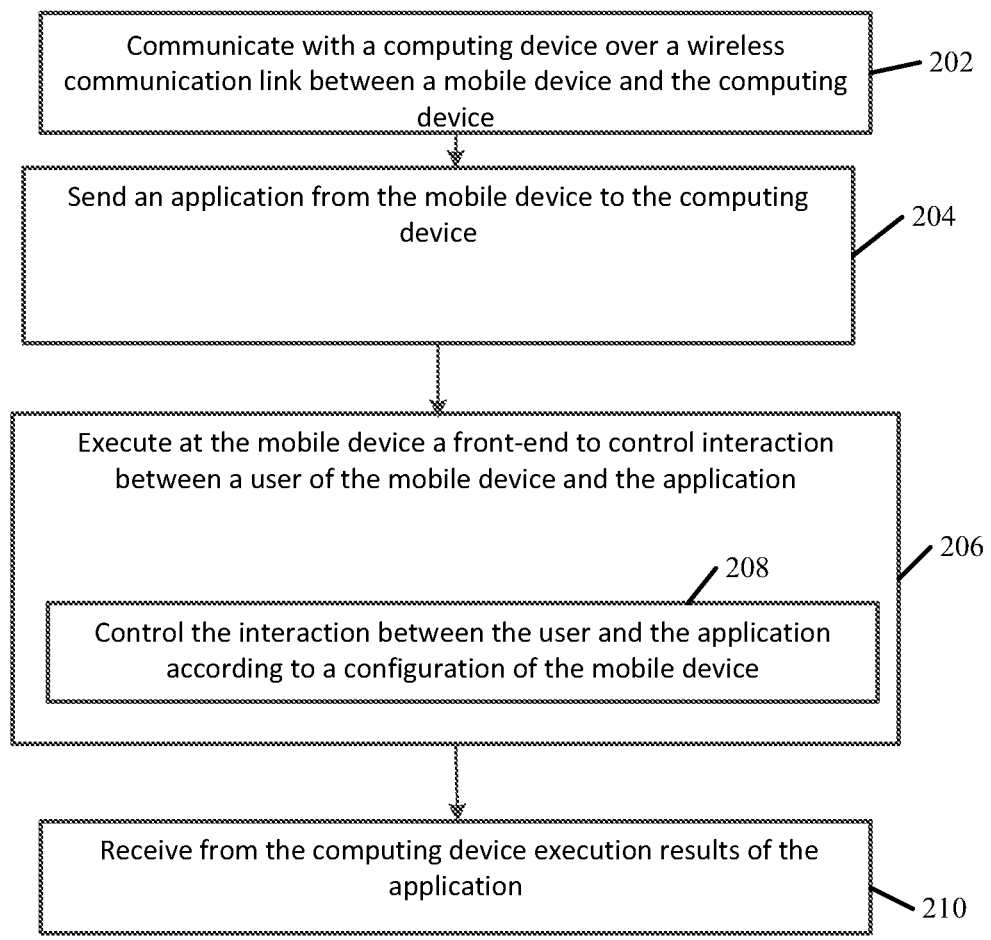
FIG. 2 is a schematic flow chart illustration of a method of managing at a mobile device execution of an application by a computing device, in accordance with some demonstrative embodiments.

Reference is now made to FIG. 2, which schematically illustrates a method of managing execution of an application by a computing device, in accordance with some demonstrative embodiments. For example, one or more of the operations of the method of FIG. 2 may be performed by a wireless communication system, e.g., system 100 (FIG. 1); a mobile device, e.g., device 120 (FIG. 1); a computing device, e.g., computing devices 140 and/or 180 (FIG. 1); an execution manager, e.g., execution manager 116 (FIG. 1); and/or a back-end manager, e.g., back-end manager 156 (FIG. 1).

As indicated at block 202, the method may include communicating with a computing device over a wireless communication link between a mobile device and the computing device. For example, mobile device 120 (FIG. 1) may communicate with computing device 140 (FIG. 1) over wireless communication link 103 (FIG. 1), e.g., as described above.

As indicated at block 204, the method may include sending an application from the mobile device to the computing device. For example, execution manager 116 (FIG. 1) may send application 115 (FIG. 1) to computing device 140 (FIG. 1), e.g., as described above.

As indicated at block 206, the method may include executing at the mobile device a front-end to control interaction between a user of the mobile device and the application. For example, execution manager 116 (FIG. 1) may execute front-end 118 (FIG. 1), e.g., as described above.

As indicated at block 208, executing the front-end at the mobile device may include controlling interaction between the user and the application according to a configuration of the mobile device. For example, front-end 118 (FIG. 1) may control the interaction between the user of mobile device 120 (FIG. 1) and application 115 (FIG. 1) according to the configuration of mobile device 120 (FIG. 1), e.g., as described above.

As indicated at block 210, the method may include receiving from the computing device execution results of the application. For example, execution manager 116 (FIG. 1) may receive from computing device 140 (FIG. 1) execution results 119 (FIG. 1) of application 115 (FIG. 1), e.g., as described above.

Figure 3:
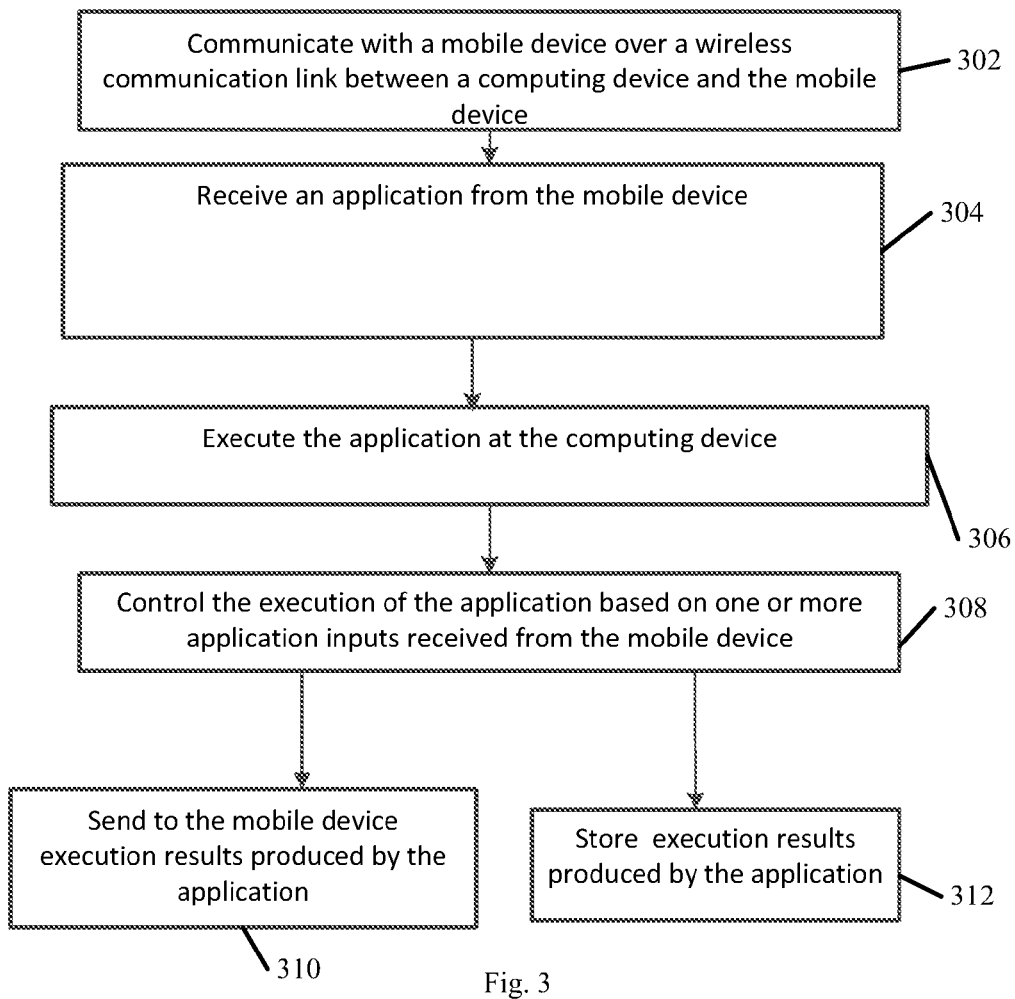
FIG. 3 is a schematic flow chart illustration of a method of managing execution of an application by a computing device, in accordance with some demonstrative embodiments.

Reference is now made to FIG. 3, which schematically illustrates a method of managing execution of an application by a computing device, in accordance with some demonstrative embodiments. For example, one or more of the operations of the method of FIG. 3 may be performed by a wireless communication system, e.g., system 100 (FIG. 1); a mobile device, e.g., device 120 (FIG. 1); a computing device, e.g., computing devices 140 and/or 180 (FIG. 1); an execution manager, e.g., execution manager 116 (FIG. 1); and/or a back-end manager, e.g., back-end manager 156 (FIG. 1).

As indicated at block 302, the method may include communicating with a mobile device over a wireless communication link between a computing device and the mobile device. For example, computing device 140 (FIG. 1) may communicate with mobile device 120 (FIG. 1) over wireless communication link 103 (FIG. 1), e.g., as described above.

As indicated at block 304, the method may include receiving an application from the mobile device. For example, execution manager 156 (FIG. 1) may receive application 115 (FIG. 1) from mobile device 120 (FIG. 1), e.g., as described above.

As indicated at block 306, the method may include executing the application at the computing device. For example, execution manager 156 (FIG. 1) may execute application 115 (FIG. 1), e.g., as described above.

As indicated at block 308, the method may include controlling the execution of the application based on one or more application inputs received from the mobile device. For example, back-end manager 156 (FIG. 1) may control the execution of application 115 (FIG. 1) based on one or more application inputs received from mobile device 120 (FIG. 1), e.g., as described above.

As indicated at block 310, the method may include sending to the mobile device execution results produced by the application. For example, execution manager 156 (FIG. 1) may send execution results 119 (FIG. 1) of application 115 (FIG. 1) to mobile device 120 (FIG. 1), e.g., as described above.

As indicated at block 312, the method may include storing execution results produced by the application. For example, execution manager 156 (FIG. 1) may store execution results 119 (FIG. 1), e.g., as described above.

Figure 4:
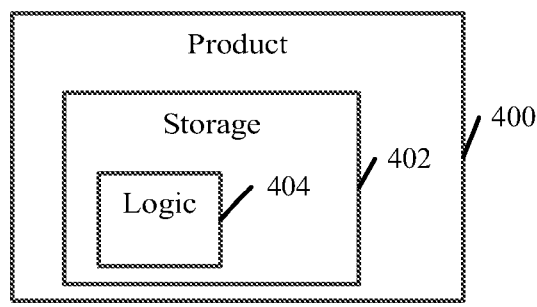
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of mobile device 120 (FIG. 1), computing device 140 (FIG. 1), execution manager 116 (FIG. 1), back-end manager 156 (FIG. 1), front-end 118 (FIG. 1), and/or to perform one or more operations of the method of FIGS. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising at least one antenna; a processor; a radio; a memory; and an execution manager to manage at the mobile device execution of an application by a computing device, the execution manager to communicate with the computing device over a wireless communication link between the mobile device and the computing device, and to execute at the mobile device a front-end to control interaction between a user of the mobile device and the application according to a configuration of the mobile device.

Example 2 includes the subject matter of Example 1, and optionally, wherein the execution manager is to send the application from the mobile device to the computing device.

Example 3 includes the subject matter of Example 1 or 2, and optionally, wherein the application is to utilize computing resources, which exceed computing resources of the mobile device.

Example 4 includes the subject matter of any one of Examples 1-3, and optionally, wherein the front-end is to control the interaction according to at least one configuration attribute selected from the group consisting of a configuration of at least one computing resource of the mobile device and a configuration of at least one interface of the mobile device.

Example 5 includes the subject matter of Example 4, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 6 includes the subject matter of Example 4 or 5, and optionally, wherein the at least one interface comprises an interface selected from the group consisting of an input interface of the mobile device and an output interface of the mobile device.

Example 7 includes the subject matter of Example 6, and optionally, wherein the input interface is different from an application input interface of the application, and wherein the front-end is to convert user inputs received from the user via the input interface into application inputs to be provided to the application via the application input interface.

Example 8 includes the subject matter of Example 6 or 7, and optionally, wherein the output interface is different from an application output interface of the application, and wherein the front-end is to convert application outputs from the application output interface into outputs to be provided to the user via the output interface.

Example 9 includes the subject matter of any one of Examples 1-8, and optionally, wherein the front-end is to display a user interface of the application on the mobile device.

Example 10 includes the subject matter of any one of Examples 1-9, and optionally, wherein the execution manager is to open a session between the mobile device and the computing device, to manage the execution of the application during the session, and to store a unique session identifier assigned to the session.

Example 11 includes the subject matter of Example 10, and optionally, wherein after disconnection of the wireless communication link, the execution manager is to reestablish the wireless communication link, and to continue to execute the application on the computing device, based on the session identifier.

Example 12 includes the subject matter of any one of Examples 1-11, and optionally, wherein the execution manager is to receive from the computing device execution results of the application.

Example 13 includes the subject matter of Example 12, and optionally, wherein the execution manager is to open another session with another computing device, and to manage execution of the application on the another computing device using the execution results.

Example 14 includes the subject matter of Example 13, and optionally, wherein the execution manager is to receive from the another computing device other execution results of the application, and to send the other execution results to the computing device.

Example 15 includes the subject matter of any one of Examples 1-14, and optionally, wherein the execution manager is to receive an indication of a plurality of potential computing devices to execute the application, and to select the computing device from the plurality of potential computing devices.

Example 16 includes the subject matter of Example 15, and optionally, wherein the execution manager is to receive resource information relating to computing resources of the potential computing devices, and to select the computing device based on the resource information.

Example 17 includes the subject matter of Example 15 or 16, and optionally, wherein the execution manager is to select the computing device based on an input from the user of the mobile device.

Example 18 includes the subject matter of any one of Examples 1-17, and optionally, wherein the wireless communication link comprises a Wireless Fidelity (WiFi) Direct wireless communication link.

Example 19 includes the subject matter of any one of Examples 1-18, and optionally, wherein the wireless communication link comprises a peer-to-peer (P2P) communication link.

Example 20 includes a mobile device comprising at least one antenna; a processor; a radio; a memory; and an execution manager to manage at the mobile device execution of an application by a computing device, the execution manager to communicate with the computing device over a wireless communication link between the mobile device and the computing device, to send the application from the mobile device to the computing device, and to execute at the mobile device a front-end to control interaction between a user of the mobile device and the application.

Example 21 includes the subject matter of Example 20, and optionally, wherein the application is to utilize computing resources, which exceed computing resources of the mobile device.

Example 22 includes the subject matter of Example 20 or 21, and optionally, wherein the front-end is to control interaction between the user and the application according to a configuration of the mobile device.

Example 23 includes the subject matter of Example 22, and optionally, wherein the front-end is to control the interaction according to at least one configuration attribute selected from the group consisting of a configuration of at least one computing resource of the mobile device and a configuration of at least one interface of the mobile device.

Example 24 includes the subject matter of Example 23, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 25 includes the subject matter of Example 23 or 24, and optionally, wherein the at least one interface comprises an interface selected from the group consisting of an input interface of the mobile device and an output interface of the mobile device.

Example 26 includes the subject matter of Example 25, and optionally, wherein the input interface is different from an application input interface of the application, and wherein the front-end is to convert user inputs received from the user via the input interface into application inputs to be provided to the application via the application input interface.

Example 27 includes the subject matter of Example 25 or 26, and optionally, wherein the output interface is different from an application output interface of the application, and wherein the front-end is to convert application outputs from the application output interface into outputs to be provided to the user via the output interface.

Example 28 includes the subject matter of any one of Examples 20-27, and optionally, wherein the front-end is to display a user interface of the application on the mobile device.

Example 29 includes the subject matter of any one of Examples 20-28, and optionally, wherein the execution manager is to open a session between the mobile device and the computing device, to manage the execution of the application during the session, and to store a unique session identifier assigned to the session.

Example 30 includes the subject matter of Example 29, and optionally, wherein after disconnection of the wireless communication link, the execution manager is to reestablish the wireless communication link, and to continue to execute the application on the computing device, based on the session identifier.

Example 31 includes the subject matter of any one of Examples 20-30, and optionally, wherein the execution manager is to receive from the computing device execution results of the application.

Example 32 includes the subject matter of Example 31, and optionally, wherein the execution manager is to open another session with another computing device, and to manage execution of the application on the another computing device using the execution results.

Example 33 includes the subject matter of Example 32, and optionally, wherein the execution manager is to receive from the another computing device other execution results of the application, and to send the other execution results to the computing device.

Example 34 includes the subject matter of any one of Examples 20-33, and optionally, wherein the execution manager is to receive an indication of a plurality of potential computing devices to execute the application, and to select the computing device from the plurality of potential computing devices.

Example 35 includes the subject matter of Example 34, and optionally, wherein the execution manager is to receive resource information relating to computing resources of the potential computing devices, and to select the computing device based on the resource information.

Example 36 includes the subject matter of Example 34 or 35, and optionally, wherein the execution manager is to select the computing device based on an input from the user of the mobile device.

Example 37 includes the subject matter of any one of Examples 20-36, and optionally, wherein the wireless communication link comprises a Wireless Fidelity (WiFi) Direct wireless communication link.

Example 38 includes the subject matter of any one of Examples 20-37, and optionally, wherein the wireless communication link comprises a peer-to-peer (P2P) communication link.

Example 39 includes a computing device comprising at least one antenna; a processor; a radio; a memory; and a back-end manager to communicate with a mobile device over a wireless communication link between the computing device and the mobile device, to receive an application from the mobile device, to execute the application at the computing device, to control the execution of the application based on one or more application inputs received from the mobile device, and to send to the mobile device execution results produced by the application.

Example 40 includes the subject matter of Example 39, and optionally, wherein the execution manager is to send to the mobile device resource information relating to computing resources of the computing device.

Example 41 includes the subject matter of Example 40, and optionally, wherein the computing resources comprise one or more computing resources selected from the group consisting of a memory resource of the computing device, a processing resource of the computing device, a graphical processing resource of the computing device, a storage resource of the computing device, a data transfer resource of the computing device, and a power resource of the computing device.

Example 42 includes the subject matter of any one of Examples 39-41, and optionally, wherein the back-end manager is to open a session between the mobile device and the computing device, to control the execution of the application during the session, and to store a unique session identifier assigned to the session.

Example 43 includes the subject matter of Example 42, and optionally, wherein the back-end manager is to store the execution results of the application associated with the session identifier.

Example 44 includes the subject matter of Example 43, and optionally, wherein the back-end manager is to receive updated execution results from the mobile device, to update the execution results with the updated execution results, and to execute the application using the updated execution results.

Example 45 includes the subject matter of Example 43 or 44, and optionally, wherein the back-end manager is to delete the execution results based on an indication received from the mobile device.

Example 46 includes the subject matter of any one of Examples 43-45, and optionally, wherein the back-end manager is to receive the session identifier from the mobile device, to retrieve the execution results based on the session identifier, and to execute the application using the execution results.

Example 47 includes the subject matter of any one of Examples 42-46, and optionally, wherein the back-end manager is to send the execution results to the mobile device when the session is closed.

Example 48 includes the subject matter of any one of Examples 39-47, and optionally, wherein the back-end manager is to periodically send the execution results to the mobile device.

Example 49 includes the subject matter of any one of Examples 39-48, and optionally, wherein the wireless communication link comprises a Wireless Fidelity (WiFi) Direct wireless communication link.

Example 50 includes the subject matter of any one of Examples 39-49, and optionally, wherein the wireless communication link comprises a peer-to-peer (P2P) communication link.

Example 51 includes an apparatus comprising an execution manager to manage at a mobile device execution of an application by a computing device, the execution manager to communicate with the computing device over a wireless communication link between the mobile device and the computing device, and to execute at the mobile device a front-end to control interaction between a user of the mobile device and the application according to a configuration of the mobile device.

Example 52 includes the subject matter of Example 51, and optionally, wherein the execution manager is to send the application from the mobile device to the computing device.

Example 53 includes the subject matter of Example 51 or 52, and optionally, wherein the application is to utilize computing resources, which exceed computing resources of the mobile device.

Example 54 includes the subject matter of any one of Examples 51-53, and optionally, wherein the front-end is to control the interaction according to at least one configuration attribute selected from the group consisting of a configuration of at least one computing resource of the mobile device and a configuration of at least one interface of the mobile device.

Example 55 includes the subject matter of Example 54, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 56 includes the subject matter of Example 54 or 55, and optionally, wherein the at least one interface comprises an interface selected from the group consisting of an input interface of the mobile device and an output interface of the mobile device.

Example 57 includes the subject matter of Example 56, and optionally, wherein the input interface is different from an application input interface of the application, and wherein the front-end is to convert user inputs received from the user via the input interface into application inputs to be provided to the application via the application input interface.

Example 58 includes the subject matter of Example 56 or 57, and optionally, wherein the output interface is different from an application output interface of the application, and wherein the front-end is to convert application outputs from the application output interface into outputs to be provided to the user via the output interface.

Example 59 includes the subject matter of any one of Examples 51-58, and optionally, wherein the front-end is to display a user interface of the application on the mobile device.

Example 60 includes the subject matter of any one of Examples 51-59, and optionally, wherein the execution manager is to open a session between the mobile device and the computing device, to manage the execution of the application during the session, and to store a unique session identifier assigned to the session.

Example 61 includes the subject matter of Example 60, and optionally, wherein after disconnection of the wireless communication link, the execution manager is to reestablish the wireless communication link, and to continue to execute the application on the computing device, based on the session identifier.

Example 62 includes the subject matter of any one of Examples 51-61, and optionally, wherein the execution manager is to receive from the computing device execution results of the application.

Example 63 includes the subject matter of Example 62, and optionally, wherein the execution manager is to open another session with another computing device, and to manage execution of the application on the another computing device using the execution results.

Example 64 includes the subject matter of Example 63, and optionally, wherein the execution manager is to receive from the another computing device other execution results of the application, and to send the other execution results to the computing device.

Example 65 includes the subject matter of any one of Examples 51-64, and optionally, wherein the execution manager is to receive an indication of a plurality of potential computing devices to execute the application, and to select the computing device from the plurality of potential computing devices.

Example 66 includes the subject matter of Example 65, and optionally, wherein the execution manager is to receive resource information relating to computing resources of the potential computing devices, and to select the computing device based on the resource information.

Example 67 includes the subject matter of Example 65 or 66, and optionally, wherein the execution manager is to select the computing device based on an input from the user of the mobile device.

Example 68 includes the subject matter of any one of Examples 51-67, and optionally, wherein the wireless communication link comprises a Wireless Fidelity (WiFi) Direct wireless communication link.

Example 69 includes the subject matter of any one of Examples 51-68, and optionally, wherein the wireless communication link comprises a peer-to-peer (P2P) communication link.

Example 70 includes an apparatus comprising an execution manager to manage at a mobile device execution of an application by a computing device, the execution manager to communicate with the computing device over a wireless communication link between the mobile device and the computing device, to send the application from the mobile device to the computing device, and to execute at the mobile device a front-end to control interaction between a user of the mobile device and the application.

Example 71 includes the subject matter of Example 70, and optionally, wherein the application is to utilize computing resources, which exceed computing resources of the mobile device.

Example 72 includes the subject matter of Example 70 or 71, and optionally, wherein the front-end is to control interaction between the user and the application according to a configuration of the mobile device.

Example 73 includes the subject matter of Example 72, and optionally, wherein the front-end is to control the interaction according to at least one configuration attribute selected from the group consisting of a configuration of at least one computing resource of the mobile device and a configuration of at least one interface of the mobile device.

Example 74 includes the subject matter of Example 73, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 75 includes the subject matter of Example 73 or 74, and optionally, wherein the at least one interface comprises an interface selected from the group consisting of an input interface of the mobile device and an output interface of the mobile device.

Example 76 includes the subject matter of Example 75, and optionally, wherein the input interface is different from an application input interface of the application, and wherein the front-end is to convert user inputs received from the user via the input interface into application inputs to be provided to the application via the application input interface.

Example 77 includes the subject matter of Example 75 or 76, and optionally, wherein the output interface is different from an application output interface of the application, and wherein the front-end is to convert application outputs from the application output interface into outputs to be provided to the user via the output interface.

Example 78 includes the subject matter of any one of Examples 70-77, and optionally, wherein the front-end is to display a user interface of the application on the mobile device.

Example 79 includes the subject matter of any one of Examples 70-78, and optionally, wherein the execution manager is to open a session between the mobile device and the computing device, to manage the execution of the application during the session, and to store a unique session identifier assigned to the session.

Example 80 includes the subject matter of Example 79, and optionally, wherein after disconnection of the wireless communication link, the execution manager is to reestablish the wireless communication link, and to continue to execute the application on the computing device, based on the session identifier.

Example 81 includes the subject matter of any one of Examples 70-80, and optionally, wherein the execution manager is to receive from the computing device execution results of the application.

Example 82 includes the subject matter of Example 81, and optionally, wherein the execution manager is to open another session with another computing device, and to manage execution of the application on the another computing device using the execution results.

Example 83 includes the subject matter of Example 82, and optionally, wherein the execution manager is to receive from the another computing device other execution results of the application, and to send the other execution results to the computing device.

Example 84 includes the subject matter of any one of Examples 70-83, and optionally, wherein the execution manager is to receive an indication of a plurality of potential computing devices to execute the application, and to select the computing device from the plurality of potential computing devices.

Example 85 includes the subject matter of Example 84, and optionally, wherein the execution manager is to receive resource information relating to computing resources of the potential computing devices, and to select the computing device based on the resource information.

Example 86 includes the subject matter of Example 84 or 85, and optionally, wherein the execution manager is to select the computing device based on an input from the user of the mobile device.

Example 87 includes the subject matter of any one of Examples 70-86, and optionally, wherein the wireless communication link comprises a Wireless Fidelity (WiFi) Direct wireless communication link.

Example 88 includes the subject matter of any one of Examples 70-87, and optionally, wherein the wireless communication link comprises a peer-to-peer (P2P) communication link.

Example 89 includes an apparatus comprising a back-end manager to communicate with a mobile device over a wireless communication link between a computing device and the mobile device, to receive an application from the mobile device, to execute the application at the computing device, to control the execution of the application based on one or more application inputs received from the mobile device, and to send to the mobile device execution results produced by the application.

Example 90 includes the subject matter of Example 89, and optionally, wherein the execution manager is to send to the mobile device resource information relating to computing resources of the computing device.

Example 91 includes the subject matter of Example 90, and optionally, wherein the computing resources comprise one or more computing resources selected from the group consisting of a memory resource of the computing device, a processing resource of the computing device, a graphical processing resource of the computing device, a storage resource of the computing device, a data transfer resource of the computing device, and a power resource of the computing device.

Example 92 includes the subject matter of any one of Examples 89-91, and optionally, wherein the back-end manager is to open a session between the mobile device and the computing device, to control the execution of the application during the session, and to store a unique session identifier assigned to the session.

Example 93 includes the subject matter of Example 92, and optionally, wherein the back-end manager is to store the execution results of the application associated with the session identifier.

Example 94 includes the subject matter of Example 93, and optionally, wherein the back-end manager is to receive updated execution results from the mobile device, to update the execution results with the updated execution results, and to execute the application using the updated execution results.

Example 95 includes the subject matter of Example 93 or 94, and optionally, wherein the back-end manager is to delete the execution results based on an indication received from the mobile device.

Example 96 includes the subject matter of any one of Examples 93-95, and optionally, wherein the back-end manager is to receive the session identifier from the mobile device, to retrieve the execution results based on the session identifier, and to execute the application using the execution results.

Example 97 includes the subject matter of any one of Examples 92-96, and optionally, wherein the back-end manager is to send the execution results to the mobile device when the session is closed.

Example 98 includes the subject matter of any one of Examples 89-97, and optionally, wherein the back-end manager is to periodically send the execution results to the mobile device.

Example 99 includes the subject matter of any one of Examples 89-98, and optionally, wherein the wireless communication link comprises a Wireless Fidelity (WiFi) Direct wireless communication link.

Example 100 includes the subject matter of any one of Examples 89-99, and optionally, wherein the wireless communication link comprises a peer-to-peer (P2P) communication link.

Example 101 includes a method performed at a mobile device, the method comprising communicating with a computing device over a wireless communication link between the mobile device and the computing device; and executing at the mobile device a front-end to control interaction between a user of the mobile device and an application executed by the computing device according to a configuration of the mobile device.

Example 102 includes the subject matter of Example 101, and optionally, comprising sending the application from the mobile device to the computing device.

Example 103 includes the subject matter of Example 101 or 102, and optionally, wherein the application is to utilize computing resources, which exceed computing resources of the mobile device.

Example 104 includes the subject matter of any one of Examples 101-103, and optionally, comprising controlling the interaction according to at least one configuration attribute selected from the group consisting of a configuration of at least one computing resource of the mobile device and a configuration of at least one interface of the mobile device.

Example 105 includes the subject matter of Example 104, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 106 includes the subject matter of Example 104 or 105, and optionally, wherein the at least one interface comprises an interface selected from the group consisting of an input interface of the mobile device and an output interface of the mobile device.

Example 107 includes the subject matter of Example 106, and optionally, wherein the input interface is different from an application input interface of the application, the method comprising converting user inputs received from the user via the input interface into application inputs to be provided to the application via the application input interface.

Example 108 includes the subject matter of Example 106 or 107, and optionally, wherein the output interface is different from an application output interface of the application, the method comprising converting application outputs from the application output interface into outputs to be provided to the user via the output interface.

Example 109 includes the subject matter of any one of Examples 101-108, and optionally, comprising displaying a user interface of the application on the mobile device.

Example 110 includes the subject matter of any one of Examples 101-109, and optionally, comprising opening a session between the mobile device and the computing device, managing the execution of the application during the session, and storing a unique session identifier assigned to the session.

Example 111 includes the subject matter of Example 110, and optionally, comprising, after disconnection of the wireless communication link, reestablishing the wireless communication link, and continuing to execute the application on the computing device, based on the session identifier.

Example 112 includes the subject matter of any one of Examples 101-111, and optionally, comprising receiving from the computing device execution results of the application.

Example 113 includes the subject matter of Example 112, and optionally, comprising opening another session with another computing device, and managing execution of the application on the another computing device using the execution results.

Example 114 includes the subject matter of Example 113, and optionally, comprising receiving from the another computing device other execution results of the application, and sending the other execution results to the computing device.

Example 115 includes the subject matter of any one of Examples 101-114, and optionally, comprising receiving an indication of a plurality of potential computing devices to execute the application, and selecting the computing device from the plurality of potential computing devices.

Example 116 includes the subject matter of Example 115, and optionally, comprising receiving resource information relating to computing resources of the potential computing devices, and selecting the computing device based on the resource information.

Example 117 includes the subject matter of Example 115 or 116, and optionally, comprising selecting the computing device based on an input from the user of the mobile device.

Example 118 includes the subject matter of any one of Examples 101-117, and optionally, wherein the wireless communication link comprises a Wireless Fidelity (WiFi) Direct wireless communication link.

Example 119 includes the subject matter of any one of Examples 101-118, and optionally, wherein the wireless communication link comprises a peer-to-peer (P2P) communication link.

Example 120 includes a method performed at a mobile device, the method comprising communicating with a computing device over a wireless communication link between the mobile device and the computing device; sending an application from the mobile device to the computing device; and executing at the mobile device a front-end to control interaction between a user of the mobile device and the application.

Example 121 includes the subject matter of Example 120, and optionally, wherein the application is to utilize computing resources, which exceed computing resources of the mobile device.

Example 122 includes the subject matter of Example 120 or 121, and optionally, comprising controlling interaction between the user and the application according to a configuration of the mobile device.

Example 123 includes the subject matter of Example 122, and optionally, comprising controlling the interaction according to at least one configuration attribute selected from the group consisting of a configuration of at least one computing resource of the mobile device and a configuration of at least one interface of the mobile device.

Example 124 includes the subject matter of Example 123, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 125 includes the subject matter of Example 123 or 124, and optionally, wherein the at least one interface comprises an interface selected from the group consisting of an input interface of the mobile device and an output interface of the mobile device.

Example 126 includes the subject matter of Example 125, and optionally, wherein the input interface is different from an application input interface of the application, the method comprising converting user inputs received from the user via the input interface into application inputs to be provided to the application via the application input interface.

Example 127 includes the subject matter of Example 125 or 126, and optionally, wherein the output interface is different from an application output interface of the application, the method comprising converting application outputs from the application output interface into outputs to be provided to the user via the output interface.

Example 128 includes the subject matter of any one of Examples 120-127, and optionally, comprising displaying a user interface of the application on the mobile device.

Example 129 includes the subject matter of any one of Examples 120-128, and optionally, comprising opening a session between the mobile device and the computing device, managing the execution of the application during the session, and storing a unique session identifier assigned to the session.

Example 130 includes the subject matter of Example 129, and optionally, comprising, after disconnection of the wireless communication link, reestablishing the wireless communication link, and continuing to execute the application on the computing device, based on the session identifier.

Example 131 includes the subject matter of any one of Examples 120-130, and optionally, comprising receiving from the computing device execution results of the application.

Example 132 includes the subject matter of Example 131, and optionally, comprising opening another session with another computing device, and managing execution of the application on the another computing device using the execution results.

Example 133 includes the subject matter of Example 132, and optionally, comprising receiving from the another computing device other execution results of the application, and sending the other execution results to the computing device.

Example 134 includes the subject matter of any one of Examples 120-133, and optionally, comprising receiving an indication of a plurality of potential computing devices to execute the application, and selecting the computing device from the plurality of potential computing devices.

Example 135 includes the subject matter of Example 134, and optionally, comprising receiving resource information relating to computing resources of the potential computing devices, and selecting the computing device based on the resource information.

Example 136 includes the subject matter of Example 134 or 135, and optionally, comprising selecting the computing device based on an input from the user of the mobile device.

Example 137 includes the subject matter of any one of Examples 120-136, and optionally, wherein the wireless communication link comprises a Wireless Fidelity (WiFi) Direct wireless communication link.

Example 138 includes the subject matter of any one of Examples 120-137, and optionally, wherein the wireless communication link comprises a peer-to-peer (P2P) communication link.

Example 139 includes a method performed at a computing device, the method comprising communicating with a mobile device over a wireless communication link between the computing device and the mobile device; receiving an application from the mobile device; executing the application at the computing device; controlling execution of the application based on one or more application inputs received from the mobile device; and sending to the mobile device execution results produced by the application.

Example 140 includes the subject matter of Example 139, and optionally, comprising sending to the mobile device resource information relating to computing resources of the computing device.

Example 141 includes the subject matter of Example 140, and optionally, wherein the computing resources comprise one or more computing resources selected from the group consisting of a memory resource of the computing device, a processing resource of the computing device, a graphical processing resource of the computing device, a storage resource of the computing device, a data transfer resource of the computing device, and a power resource of the computing device.

Example 142 includes the subject matter of any one of Examples 139-141, and optionally, comprising opening a session between the mobile device and the computing device, controlling the execution of the application during the session, and storing a unique session identifier assigned to the session.

Example 143 includes the subject matter of Example 142, and optionally, comprising storing the execution results of the application associated with the session identifier.

Example 144 includes the subject matter of Example 143, and optionally, comprising receiving updated execution results from the mobile device, updating the execution results with the updated execution results, and executing the application using the updated execution results.

Example 145 includes the subject matter of Example 143 or 144, and optionally, comprising deleting the execution results based on an indication received from the mobile device.

Example 146 includes the subject matter of any one of Examples 143-145, and optionally, comprising receiving the session identifier from the mobile device, retrieving the execution results based on the session identifier, and executing the application using the execution results.

Example 147 includes the subject matter of any one of Examples 142-146, and optionally, comprising sending the execution results to the mobile device when the session is closed.

Example 148 includes the subject matter of any one of Examples 139-147, and optionally, comprising periodically sending the execution results to the mobile device.

Example 149 includes the subject matter of any one of Examples 139-148, and optionally, wherein the wireless communication link comprises a Wireless Fidelity (WiFi) Direct wireless communication link.

Example 150 includes the subject matter of any one of Examples 139-149, and optionally, wherein the wireless communication link comprises a peer-to-peer (P2P) communication link.

Example 151 includes a product including a non-transitory storage medium having stored thereon instructions that, when executed by a machine, result in communicating with a computing device over a wireless communication link between a mobile device and the computing device; and executing at the mobile device a front-end to control interaction between a user of the mobile device and an application executed by the computing device according to a configuration of the mobile device.

Example 152 includes the subject matter of Example 151, and optionally, wherein the instructions result in sending the application from the mobile device to the computing device.

Example 153 includes the subject matter of Example 151 or 152, and optionally, wherein the application is to utilize computing resources, which exceed computing resources of the mobile device.

Example 154 includes the subject matter of any one of Examples 151-153, and optionally, wherein the instructions result in controlling the interaction according to at least one configuration attribute selected from the group consisting of a configuration of at least one computing resource of the mobile device and a configuration of at least one interface of the mobile device.

Example 155 includes the subject matter of Example 154, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 156 includes the subject matter of Example 154 or 155, and optionally, wherein the at least one interface comprises an interface selected from the group consisting of an input interface of the mobile device and an output interface of the mobile device.

Example 157 includes the subject matter of Example 156, and optionally, wherein the input interface is different from an application input interface of the application, and wherein the instructions result in converting user inputs received from the user via the input interface into application inputs to be provided to the application via the application input interface.

Example 158 includes the subject matter of Example 156 or 157, and optionally, wherein the output interface is different from an application output interface of the application, and wherein the instructions result in converting application outputs from the application output interface into outputs to be provided to the user via the output interface.

Example 159 includes the subject matter of any one of Examples 151-158, and optionally, wherein the instructions result in displaying a user interface of the application on the mobile device.

Example 160 includes the subject matter of any one of Examples 151-159, and optionally, wherein the instructions result in opening a session between the mobile device and the computing device, managing the execution of the application during the session, and storing a unique session identifier assigned to the session.

Example 161 includes the subject matter of Example 160, and optionally, wherein the instructions result in, after disconnection of the wireless communication link, reestablishing the wireless communication link, and continuing to execute the application on the computing device, based on the session identifier.

Example 162 includes the subject matter of any one of Examples 151-161, and optionally, wherein the instructions result in receiving from the computing device execution results of the application.

Example 163 includes the subject matter of Example 162, and optionally, wherein the instructions result in opening another session with another computing device, and managing execution of the application on the another computing device using the execution results.

Example 164 includes the subject matter of Example 163, and optionally, wherein the instructions result in receiving from the another computing device other execution results of the application, and sending the other execution results to the computing device.

Example 165 includes the subject matter of any one of Examples 151-164, and optionally, wherein the instructions result in receiving an indication of a plurality of potential computing devices to execute the application, and selecting the computing device from the plurality of potential computing devices.

Example 166 includes the subject matter of Example 165, and optionally, wherein the instructions result in receiving resource information relating to computing resources of the potential computing devices, and selecting the computing device based on the resource information.

Example 167 includes the subject matter of Example 165 or 166, and optionally, wherein the instructions result in selecting the computing device based on an input from the user of the mobile device.

Example 168 includes the subject matter of any one of Examples 151-167, and optionally, wherein the wireless communication link comprises a Wireless Fidelity (WiFi) Direct wireless communication link.

Example 169 includes the subject matter of any one of Examples 151-168, and optionally, wherein the wireless communication link comprises a peer-to-peer (P2P) communication link.

Example 170 includes a product including a non-transitory storage medium having stored thereon instructions that, when executed by a machine, result in communicating with a computing device over a wireless communication link between a mobile device and the computing device; sending an application from the mobile device to the computing device; and executing at the mobile device a front-end to control interaction between a user of the mobile device and the application.

Example 171 includes the subject matter of Example 170, and optionally, wherein the application is to utilize computing resources, which exceed computing resources of the mobile device.

Example 172 includes the subject matter of Example 170 or 171, and optionally, wherein the instructions result in controlling interaction between the user and the application according to a configuration of the mobile device.

Example 173 includes the subject matter of Example 172, and optionally, wherein the instructions result in controlling the interaction according to at least one configuration attribute selected from the group consisting of a configuration of at least one computing resource of the mobile device and a configuration of at least one interface of the mobile device.

Example 174 includes the subject matter of Example 173, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 175 includes the subject matter of Example 173 or 174, and optionally, wherein the at least one interface comprises an interface selected from the group consisting of an input interface of the mobile device and an output interface of the mobile device.

Example 176 includes the subject matter of Example 175, and optionally, wherein the input interface is different from an application input interface of the application, and wherein the instructions result in converting user inputs received from the user via the input interface into application inputs to be provided to the application via the application input interface.

Example 177 includes the subject matter of Example 175 or 176, and optionally, wherein the output interface is different from an application output interface of the application, and wherein the instructions result in converting application outputs from the application output interface into outputs to be provided to the user via the output interface.

Example 178 includes the subject matter of any one of Examples 170-177, and optionally, wherein the instructions result in displaying a user interface of the application on the mobile device.

Example 179 includes the subject matter of any one of Examples 170-178, and optionally, wherein the instructions result in opening a session between the mobile device and the computing device, managing the execution of the application during the session, and storing a unique session identifier assigned to the session.

Example 180 includes the subject matter of Example 179, and optionally, wherein the instructions result in, after disconnection of the wireless communication link, reestablishing the wireless communication link, and continuing to execute the application on the computing device, based on the session identifier.

Example 181 includes the subject matter of any one of Examples 170-180, and optionally, wherein the instructions result in receiving from the computing device execution results of the application.

Example 182 includes the subject matter of Example 181, and optionally, wherein the instructions result in opening another session with another computing device, and managing execution of the application on the another computing device using the execution results.

Example 183 includes the subject matter of Example 182, and optionally, wherein the instructions result in receiving from the another computing device other execution results of the application, and sending the other execution results to the computing device.

Example 184 includes the subject matter of any one of Examples 170-183, and optionally, wherein the instructions result in receiving an indication of a plurality of potential computing devices to execute the application, and selecting the computing device from the plurality of potential computing devices.

Example 185 includes the subject matter of Example 184, and optionally, wherein the instructions result in receiving resource information relating to computing resources of the potential computing devices, and selecting the computing device based on the resource information.

Example 186 includes the subject matter of Example 184 or 185, and optionally, wherein the instructions result in selecting the computing device based on an input from the user of the mobile device.

Example 187 includes the subject matter of any one of Examples 170-186, and optionally, wherein the wireless communication link comprises a Wireless Fidelity (WiFi) Direct wireless communication link.

Example 188 includes the subject matter of any one of Examples 170-187, and optionally, wherein the wireless communication link comprises a peer-to-peer (P2P) communication link.

Example 189 includes a product including a non-transitory storage medium having stored thereon instructions that, when executed by a machine, result in communicating with a mobile device over a wireless communication link between a computing device and the mobile device; receiving an application from the mobile device; executing the application at the computing device; controlling execution of the application based on one or more application inputs received from the mobile device; and sending to the mobile device execution results produced by the application.

Example 190 includes the subject matter of Example 189, and optionally, wherein the instructions result in sending to the mobile device resource information relating to computing resources of the computing device.

Example 191 includes the subject matter of Example 190, and optionally, wherein the computing resources comprise one or more computing resources selected from the group consisting of a memory resource of the computing device, a processing resource of the computing device, a graphical processing resource of the computing device, a storage resource of the computing device, a data transfer resource of the computing device, and a power resource of the computing device.

Example 192 includes the subject matter of any one of Examples 189-191, and optionally, wherein the instructions result in opening a session between the mobile device and the computing device, controlling the execution of the application during the session, and storing a unique session identifier assigned to the session.

Example 193 includes the subject matter of Example 192, and optionally, wherein the instructions result in storing the execution results of the application associated with the session identifier.

Example 194 includes the subject matter of Example 193, and optionally, wherein the instructions result in receiving updated execution results from the mobile device, updating the execution results with the updated execution results, and executing the application using the updated execution results.

Example 195 includes the subject matter of Example 193 or 194, and optionally, wherein the instructions result in deleting the execution results based on an indication received from the mobile device.

Example 196 includes the subject matter of any one of Examples 193-195, and optionally, wherein the instructions result in receiving the session identifier from the mobile device, retrieving the execution results based on the session identifier, and executing the application using the execution results.

Example 197 includes the subject matter of any one of Examples 192-196, and optionally, wherein the instructions result in sending the execution results to the mobile device when the session is closed.

Example 198 includes the subject matter of any one of Examples 189-197, and optionally, wherein the instructions result in periodically sending the execution results to the mobile device.

Example 199 includes the subject matter of any one of Examples 189-198, and optionally, wherein the wireless communication link comprises a Wireless Fidelity (WiFi) Direct wireless communication link.

Example 200 includes the subject matter of any one of Examples 189-199, and optionally, wherein the wireless communication link comprises a peer-to-peer (P2P) communication link.

Example 201 includes an apparatus comprising means for communicating with a computing device over a wireless communication link between a mobile device and the computing device; and means for executing at the mobile device a front-end to control interaction between a user of the mobile device and an application executed by the computing device according to a configuration of the mobile device.

Example 202 includes the subject matter of Example 201, and optionally, comprising means for sending the application from the mobile device to the computing device.

Example 203 includes the subject matter of Example 201 or 202, and optionally, wherein the application is to utilize computing resources, which exceed computing resources of the mobile device.

Example 204 includes the subject matter of any one of Examples 201-203, and optionally, comprising means for controlling the interaction according to at least one configuration attribute selected from the group consisting of a configuration of at least one computing resource of the mobile device and a configuration of at least one interface of the mobile device.

Example 205 includes the subject matter of Example 204, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 206 includes the subject matter of Example 204 or 205, and optionally, wherein the at least one interface comprises an interface selected from the group consisting of an input interface of the mobile device and an output interface of the mobile device.

Example 207 includes the subject matter of Example 206, and optionally, wherein the input interface is different from an application input interface of the application, the apparatus comprising means for converting user inputs received from the user via the input interface into application inputs to be provided to the application via the application input interface.

Example 208 includes the subject matter of Example 206 or 207, and optionally, wherein the output interface is different from an application output interface of the application, the apparatus comprising means for converting application outputs from the application output interface into outputs to be provided to the user via the output interface.

Example 209 includes the subject matter of any one of Examples 201-208, and optionally, comprising means for displaying a user interface of the application on the mobile device.

Example 210 includes the subject matter of any one of Examples 201-209, and optionally, comprising means for opening a session between the mobile device and the computing device, managing the execution of the application during the session, and storing a unique session identifier assigned to the session.

Example 211 includes the subject matter of Example 210, and optionally, comprising means for, after disconnection of the wireless communication link, reestablishing the wireless communication link, and continuing to execute the application on the computing device, based on the session identifier.

Example 212 includes the subject matter of any one of Examples 201-211, and optionally, comprising means for receiving from the computing device execution results of the application.

Example 213 includes the subject matter of Example 212, and optionally, comprising means for opening another session with another computing device, and managing execution of the application on the another computing device using the execution results.

Example 214 includes the subject matter of Example 213, and optionally, comprising means for receiving from the another computing device other execution results of the application, and sending the other execution results to the computing device.

Example 215 includes the subject matter of any one of Examples 201-214, and optionally, comprising means for receiving an indication of a plurality of potential computing devices to execute the application, and selecting the computing device from the plurality of potential computing devices.

Example 216 includes the subject matter of Example 215, and optionally, comprising means for receiving resource information relating to computing resources of the potential computing devices, and selecting the computing device based on the resource information.

Example 217 includes the subject matter of Example 215 or 216, and optionally, comprising means for selecting the computing device based on an input from the user of the mobile device.

Example 218 includes the subject matter of any one of Examples 201-217, and optionally, wherein the wireless communication link comprises a Wireless Fidelity (WiFi) Direct wireless communication link.

Example 219 includes the subject matter of any one of Examples 201-218, and optionally, wherein the wireless communication link comprises a peer-to-peer (P2P) communication link.

Example 220 includes an apparatus comprising communicating with a computing device over a wireless communication link between a mobile device and the computing device; sending an application from the mobile device to the computing device; and executing at the mobile device a front-end to control interaction between a user of the mobile device and the application.

Example 221 includes the subject matter of Example 220, and optionally, wherein the application is to utilize computing resources, which exceed computing resources of the mobile device.

Example 222 includes the subject matter of Example 220 or 221, and optionally, comprising means for controlling interaction between the user and the application according to a configuration of the mobile device.

Example 223 includes the subject matter of Example 222, and optionally, comprising means for controlling the interaction according to at least one configuration attribute selected from the group consisting of a configuration of at least one computing resource of the mobile device and a configuration of at least one interface of the mobile device.

Example 224 includes the subject matter of Example 223, and optionally, wherein the at least one computing resource comprises a computing resource selected from the group consisting of a memory resource of the mobile device, a processing resource of the mobile device, a graphical processing resource of the mobile device, a storage resource of the mobile device, a data transfer resource of the mobile device, and a power resource of the mobile device.

Example 225 includes the subject matter of Example 223 or 224, and optionally, wherein the at least one interface comprises an interface selected from the group consisting of an input interface of the mobile device and an output interface of the mobile device.

Example 226 includes the subject matter of Example 225, and optionally, wherein the input interface is different from an application input interface of the application, the apparatus comprising means for converting user inputs received from the user via the input interface into application inputs to be provided to the application via the application input interface.

Example 227 includes the subject matter of Example 225 or 226, and optionally, wherein the output interface is different from an application output interface of the application, the apparatus comprising means for converting application outputs from the application output interface into outputs to be provided to the user via the output interface.

Example 228 includes the subject matter of any one of Examples 220-227, and optionally, comprising means for displaying a user interface of the application on the mobile device.

Example 229 includes the subject matter of any one of Examples 220-228, and optionally, comprising means for opening a session between the mobile device and the computing device, managing the execution of the application during the session, and storing a unique session identifier assigned to the session.

Example 230 includes the subject matter of Example 229, and optionally, comprising means for, after disconnection of the wireless communication link, reestablishing the wireless communication link, and continuing to execute the application on the computing device, based on the session identifier.

Example 231 includes the subject matter of any one of Examples 220-230, and optionally, comprising means for receiving from the computing device execution results of the application.

Example 232 includes the subject matter of Example 231, and optionally, comprising means for opening another session with another computing device, and managing execution of the application on the another computing device using the execution results.

Example 233 includes the subject matter of Example 232, and optionally, comprising means for receiving from the another computing device other execution results of the application, and sending the other execution results to the computing device.

Example 234 includes the subject matter of any one of Examples 220-233, and optionally, comprising means for receiving an indication of a plurality of potential computing devices to execute the application, and selecting the computing device from the plurality of potential computing devices.

Example 235 includes the subject matter of Example 234, and optionally, comprising means for receiving resource information relating to computing resources of the potential computing devices, and selecting the computing device based on the resource information.

Example 236 includes the subject matter of Example 234 or 235, and optionally, comprising means for selecting the computing device based on an input from the user of the mobile device.

Example 237 includes the subject matter of any one of Examples 220-236, and optionally, wherein the wireless communication link comprises a Wireless Fidelity (WiFi) Direct wireless communication link.

Example 238 includes the subject matter of any one of Examples 220-237, and optionally, wherein the wireless communication link comprises a peer-to-peer (P2P) communication link.

Example 239 includes an apparatus comprising communicating with a mobile device over a wireless communication link between a computing device and the mobile device; receiving an application from the mobile device; executing the application at the computing device; controlling execution of the application based on one or more application inputs received from the mobile device; and sending to the mobile device execution results produced by the application.

Example 240 includes the subject matter of Example 239, and optionally, comprising means for sending to the mobile device resource information relating to computing resources of the computing device.

Example 241 includes the subject matter of Example 240, and optionally, wherein the computing resources comprise one or more computing resources selected from the group consisting of a memory resource of the computing device, a processing resource of the computing device, a graphical processing resource of the computing device, a storage resource of the computing device, a data transfer resource of the computing device, and a power resource of the computing device.

Example 242 includes the subject matter of any one of Examples 239-241, and optionally, comprising means for opening a session between the mobile device and the computing device, controlling the execution of the application during the session, and storing a unique session identifier assigned to the session.

Example 243 includes the subject matter of Example 242, and optionally, comprising means for storing the execution results of the application associated with the session identifier.

Example 244 includes the subject matter of Example 243, and optionally, comprising means for receiving updated execution results from the mobile device, updating the execution results with the updated execution results, and executing the application using the updated execution results.

Example 245 includes the subject matter of Example 243 or 244, and optionally, comprising means for deleting the execution results based on an indication received from the mobile device.

Example 246 includes the subject matter of any one of Examples 243-245, and optionally, comprising means for receiving the session identifier from the mobile device, retrieving the execution results based on the session identifier, and executing the application using the execution results.

Example 247 includes the subject matter of any one of Examples 242-246, and optionally, comprising means for sending the execution results to the mobile device when the session is closed.

Example 248 includes the subject matter of any one of Examples 239-247, and optionally, comprising means for periodically sending the execution results to the mobile device.

Example 249 includes the subject matter of any one of Examples 239-248, and optionally, wherein the wireless communication link comprises a Wireless Fidelity (WiFi) Direct wireless communication link.

Example 250 includes the subject matter of any one of Examples 239-249, and optionally, wherein the wireless communication link comprises a peer-to-peer (P2P) communication link.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A mobile device comprising:
    a radio comprising one or more hardware components configured to transmit and receive wireless communication signals; and
    an execution manager to receive at least first and second power source state indications of at least first and second respective computing devices, said execution manager to determine a selected computing device from the at least first and second computing devices based at least on a power source state of the at least first and second computing devices, said execution manager to manage at the mobile device execution of an application by the selected computing device, said execution manager to communicate with said selected computing device over a wireless communication link between said mobile device and said selected computing device, and to execute at said mobile device a front-end to control interaction between a user of said mobile device and said application, according to at least one configuration attribute selected from the group consisting of a configuration of at least one computing resource of said mobile device, and a configuration of at least one interface of said mobile device, said front-end is configured to cause the mobile device to display to the user of the mobile device a user interface configured to interface between the user and the application, the front-end is configured to convert user inputs received from said user via the user interface into application inputs to be provided to said application according to a configuration of an application input interface of said application.

2. The mobile device of claim 1, wherein said execution manager is to send said application from said mobile device to said selected computing device.

3. The mobile device of claim 1, wherein said application is to utilize computing resources, which exceed computing resources of said mobile device.

4. The mobile device of claim 1, wherein said at least one computing resource comprises a computing resource selected from the group consisting of a memory resource of said mobile device, a processing resource of said mobile device, a graphical processing resource of said mobile device, a storage resource of said mobile device, a data transfer resource of said mobile device, and a power resource of said mobile device.

5. The mobile device of claim 1, wherein said at least one interface comprises an interface selected from the group consisting of an input interface of said mobile device and an output interface of said mobile device.

6. The mobile device of claim 5, wherein said output interface is different from an application output interface of said application, and wherein said front-end is to convert application outputs from said application output interface into outputs to be provided to said user via said output interface.

7. The mobile device of claim 1, wherein an input interface of said mobile device is different from the application input interface of said application.

8. The mobile device of claim 1, wherein said execution manager is to open a session between said mobile device and said selected computing device, to manage said execution of said application during said session, and to store a unique session identifier assigned to said session.

9. The mobile device of claim 8, wherein after disconnection of said wireless communication link, said execution manager is to cause the mobile device to reestablish said wireless communication link, and to continue to execute said application on said selected computing device, based on said session identifier.

10. The mobile device of claim 1, wherein said execution manager is to receive from said selected computing device execution results of said application.

11. The mobile device of claim 10, wherein said execution manager is to open another session with another computing device, and to manage execution of said application on said another computing device using said execution results.

12. The mobile device of claim 1, wherein said execution manager is to receive from the at least first and second computing devices at least first and second respective resource information indications, the first resource information indication indicating first computing resources of the first computing device and the second resource information indication indicating second computing resources of the second computing device, the execution manager is to select the selected computing device based at least on the first and second computing resources.

13. The mobile device of claim 1, wherein said execution manager is to select said selected computing device based on an input from the user of said mobile device.

14. A computing device comprising:
a radio comprising one or more hardware components configured to transmit and receive wireless communication signals; and
a back-end manager to communicate with a mobile device over a wireless communication link between said computing device and said mobile device, the back-end manager to cause the radio to transmit to the mobile device resource information indicating a status of at least one resource selected from the group consisting of a memory of the computing device, a power source of the computing device, and a processor utilization of the computing device, the back-end manager to open a session between said mobile device and said computing device, to receive an application from said mobile device, to execute said application at said computing device, to control said execution of said application during said session based on one or more application inputs received from said mobile device, to send to said mobile device execution results produced by said application based on processing of the application inputs received from the mobile device, to store a unique session identifier assigned to said session, and to store said execution results of said application associated with said session identifier.

15. The computing device of claim 14, wherein said back-end manager is to update said execution results with updated execution results from said mobile device, and to execute said application using said updated execution results.

16. The computing device of claim 14, wherein said back-end manager is to receive said session identifier from said mobile device, to retrieve said execution results based on said session identifier, and to execute said application using said execution results.

17. A product including a non-transitory storage medium having stored thereon instructions that, when executed by a machine, result in:

communicating with at least first and second computing devices over wireless communication links between a mobile device and said first and second computing device;
receiving from the at least first and second computing devices at least first and second respective resource information indications, the first resource information indication indicating at least a first power source state of the first computing device, and the second resource information indication indicating at least a second power source state of the second computing device;
selecting from the at least first and second computing devices a selected computing device based at least on the first and second power source states;
sending an application from said mobile device to said selected computing device; and
executing at said mobile device a front-end to control interaction between a user of said mobile device and said application according to at least one configuration attribute selected from the group consisting of a configuration of at least one computing resource of said mobile device, and a configuration of at least one interface of said mobile device, executing the front-end comprises causing the mobile device to display a user interface to the user of the mobile device, and converting user inputs received from said user via the user interface into application inputs to be provided to said application according to a configuration of an application input interface of said application.

18. The product of claim 17, wherein said instructions result in receiving from said selected computing device execution results of said application.

19. A product including a non-transitory storage medium having stored thereon instructions that, when executed by a machine, result in:
communicating with a mobile device over a wireless communication link between a computing device and said mobile device;
transmitting to the mobile device resource information indicating a status of at least one resource selected from the group consisting of a memory of the computing device, a power source of the computing device, and a processor utilization of the computing device;
based on the resource information, opening a session between said mobile device and said computing device;
receiving an application from said mobile device;
executing said application at said computing device;
controlling execution of said application during said session based on one or more application inputs received from said mobile device;
sending to said mobile device execution results produced by said application based on processing of the application inputs received from the mobile device;
storing a unique session identifier assigned to said session; and
storing said execution results of said application associated with said session identifier.

20. The product of claim 19, wherein said instructions result in sending to said mobile device resource information relating to computing resources of said computing device.

* * * * *